(12) United States Patent
Harada et al.

(10) Patent No.: US 8,400,962 B2
(45) Date of Patent: Mar. 19, 2013

(54) TRANSMITTER APPARATUS, RECEIVER APPARATUS, MOBILE STATION, RADIO BASE STATION, MOBILE COMMUNICATION SYSTEM AND MOBILE COMMUNICATION METHOD

(75) Inventors: Atsushi Harada, Kawasaki (JP); Minami Ishii, Yokohama (JP); Sadayuki Abeta, Yokohama (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 421 days.

(21) Appl. No.: 12/521,529

(22) PCT Filed: Dec. 27, 2007

(86) PCT No.: PCT/JP2007/075154
§ 371 (c)(1),
(2), (4) Date: Sep. 23, 2009

(87) PCT Pub. No.: WO2008/081881
PCT Pub. Date: Jul. 10, 2008

(65) Prior Publication Data
US 2011/0149840 A1    Jun. 23, 2011

(30) Foreign Application Priority Data
Dec. 28, 2006 (JP) .............................. P2006-356655

(51) Int. Cl.
*H04W 4/00* (2009.01)
(52) U.S. Cl. .................. 370/328; 455/403; 455/422.1
(58) Field of Classification Search .......... 370/310–350
See application file for complete search history.

(56) References Cited

U.S. PATENT DOCUMENTS

| | | | |
|---|---|---|---|
| 2003/0039270 A1* | 2/2003 | Chang et al. | 370/469 |
| 2004/0146067 A1* | 7/2004 | Yi et al. | 370/474 |
| 2006/0007886 A1* | 1/2006 | Lee et al. | 370/329 |
| 2006/0067238 A1 | 3/2006 | Olsson et al. | |

FOREIGN PATENT DOCUMENTS

| | | |
|---|---|---|
| CN | 1806401 A | 7/2006 |
| EP | 1191759 A2 | 3/2002 |
| JP | 2003-284135 A | 10/2003 |
| JP | 2008-048326 | 2/2008 |
| WO | 2004/042964 A1 | 5/2004 |
| WO | 2005/006599 A1 | 1/2005 |

(Continued)

OTHER PUBLICATIONS

Japanese Office Action for Application No. 2008-552155, mailed on Oct. 5, 2010 (6 pages).

(Continued)

*Primary Examiner* — Charles C Jiang
(74) *Attorney, Agent, or Firm* — Osha Liang LLP

(57) ABSTRACT

A transmitter apparatus includes an MAC-PDU generator section configured to generate an MAC-PDU by multiplexing information elements in an MAC layer and a first data unit transmitter section configured to transmit the generated MAC-PDU. Each of the information elements is any of an MAC-SDU received from an RLC layer, an MAC control block and Padding. The MAC-PDU generator section is configured to add an MAC header to the first data unit. The MAC header includes a C/T identifying a type of each of the information elements multiplexed into the MAC-PDU and an LI indicating a size of each of the information elements.

6 Claims, 6 Drawing Sheets (a)

| C / T | INFORMATION ELEMENT |
|---|---|
| 0000 | DCCH |
| 0001–1000 | DTCH#1~#8 |
| 1001 | CCCH |
| 1010 | MAC CONTROL BLOCK |
| 1011 | Padding |

(b)

| C/T | INFORMATION ELEMENT |
|---|---|
| 0000 | MCCH |
| 0001–1111 | MTCH#1~#15 |

FOREIGN PATENT DOCUMENTS

| | | |
|---|---|---|
| WO | 2005/076688 A2 | 8/2005 |
| WO | 2005/122528 A1 | 12/2005 |
| WO | 2005/125125 A1 | 12/2005 |
| WO | 2006/067570 A1 | 6/2006 |
| WO | 2006/113712 A1 | 10/2006 |

OTHER PUBLICATIONS

Office Action for Japanese Application No. 2008-552155 mailed on Apr. 13, 2010 and English translation thereof, 5 pages.

Japanese Office Action for Application No. 2008-552155, mailed on Jul. 20, 2010 (4 pages).

Indonesian Office Action for Application No. W-00 2009 01822, mailed on Jun. 17, 2011, and English translation thereof (4 pages).

Chinese Office Action for Application No. 200780048872.3, mailed on Jun. 21, 2011, and English translation thereof (16 pages).

Japanese Office Action for Application No. 2011-083124, mailed on Jul. 5, 2011, and English translation thereof (4 pages).

Japanese Office Action for Application No. 2008-552155, mailed on Jan. 4, 2011 (2 pages).

International Search Report for PCT/JP2007/075154 mailed Apr. 15, 2008 (5 pages).

Written Opinion of ISA for PCT/JP2007/075154 mailed Apr. 15, 2008 (4 pages).

3GPP TS 25.321 V7.0.0 (Mar. 2006) "Technical Specification Group Radio Access Network; Medium Access Control (MAC) protocol specification" (94 pages).

Office Action for Russian Application No. 2009127537/07 mailed Dec. 2, 2011, with English translation thereof (9 pages).

Official Action Letter issued in Chinese Patent Application No. 200780048872.3, mailing date May 21, 2012, and English translation thereof (17 pages).

Office Action for European Application No. 07860376.8 dated Sep. 7, 2012 (7 pages).

3GPP TSG RAN WG2 #56bis, R2-070280, "MAC PDU structure for LTE," NTT DoCoMo, Inc., Sorrento, Italy, Jan. 15-19, 2007 (4 pages).

* cited by examiner

| C/T | INFORMATION ELEMENT |
|---|---|
| 0000 | DCCH |
| 0001-1000 | DTCH#1~#8 |
| 1001 | CCCH |
| 1010 | MAC CONTROL BLOCK |
| 1011 | Padding |

(b)

| C/T | INFORMATION ELEMENT |
|---|---|
| 0000 | MCCH |
| 0001-1111 | MTCH#1~#15 |

| ID | INFORMATION PIECE | LENGTH |
|---|---|---|
| 00 | Buffer status report | xx |
| ⋮ | ⋮ | ⋮ |

(b)

| ID | INFORMATION PIECE | LENGTH |
|---|---|---|
| 00 | Timing Advance | aa |
| ⋮ | ⋮ | ⋮ |

| MAC-hs PDU | N | SID#1 | SID#2 | MAC-d PDU#1 | MAC-d PDU |

TRANSMITTER APPARATUS, RECEIVER APPARATUS, MOBILE STATION, RADIO BASE STATION, MOBILE COMMUNICATION SYSTEM AND MOBILE COMMUNICATION METHOD

TECHNICAL FIELD

The present invention relates to a transmitter apparatus, a receiver apparatus, a mobile station, a radio base station, a mobile communication system and a mobile communication method.

BACKGROUND ART

As shown in FIG. 1, a mobile communication system standardized by the 3GPP (3rd Generation Partnership Project) is configured as follows. Specifically, a radio base station NodeB (transmitter apparatus) is configured to transmit a DCCH (Dedicated Control Channel), a DTCH (Dedicated Traffic Channel), a CCCH (Common Control Channel) and the like, to a mobile station UE (receiver apparatus) in downlink.

On the other hand, in uplink, the mobile station UE (transmitter apparatus) is configured to transmit a DCCH, a DTCH, a CCCH and the like, to the radio base station NodeB (receiver apparatus).

Moreover, as a logical channel for MBMS (Multimedia Broadcast and Multicast Service) standardized by the 3GPP, the radio base station NodeB (transmitter apparatus) is configured to transmit an MTCH (MBMS Traffic Channel) and an MCCH (MBMS Control Channel) to the mobile station UE (receiver apparatus) in downlink.

In addition, in downlink, as a physical channel for the HSDPA (High Speed Downlink Packet Access) that is the downlink high speed packet communication standard defined by the 3GPP, the radio base station NodeB (transmitter apparatus) is configured to transmit an HS-SCCH (High Speed Shared Control Channel), an HS-PDSCH (High Speed Physical Downlink Shared Channel) and the like, to the mobile station UE (receiver).

Additionally, in the HSDPA, the radio base station NodeB (transmitter apparatus) is configured to generate an MAC-hs PDU in the MAC-hs layer by multiplexing MAC-d PDUs (Protocol Data Units) received from the MAC-d layer, and to transmit the generated MAC-hs PDU by using the HS-DSCH (High Speed Downlink Shared Channel) associated with the HS-PDSCH.

Here, the MAC-d PDUs multiplexed into the MAC-hs PDU are in a fixed size for each MAC-d flow. As shown in FIG. 10, an MAC header is added to the MAC-hs PDU in the MAC-hs layer of the radio base station NodeB (transmitter apparatus), the MAC header including an "SID (Size Index Identifier)" indicative of the size of an MAC-d PDU for each MAC-d flow, and "N (Number of MAC-d PDUs)" indicative of the number of the MAC-d PDUs.

The conventional HSDPA, however, does not allow an MAC-hs header to include identification information for identifying information elements (for example, an MAC control block and the like) other than the MAC-d PDU, and to include size information indicating the respective sizes of these information elements. Thus, the conventional HSDPA has a problem that information elements with variable sizes, other than the MAC-d PDU, cannot be multiplexed into the MAC-hs PDU.

Non-Patent Document 1: 3GPP TS 25.321 v7.0.0

DISCLOSURE OF THE INVENTION

Hence, the present invention has been made in consideration of the forgoing problem, and aims to provide a transmitter apparatus and a receiver apparatus which enable multiplexing of not only a higher layer data unit but also control information and padding information into a first data unit.

A first aspect of the present invention is summarized as a transmitter apparatus including: a first data unit generator section configured to generate a first data unit by multiplexing information elements in a first layer; and a first data unit transmitter section configured to transmit the generated first data unit, wherein the information elements each is any of a higher layer data unit received from a layer higher than the first layer, control information and padding information, the first data unit generator section is configured to add header information to the first data unit, the header information including identification information identifying a type of each of the information elements multiplexed into the first data unit.

In the first aspect of the present invention, the header information may include information element size information indicating a size of each of the information elements, in addition to the identification information.

A second aspect of the present invention is summarized as a receiver apparatus including: a first data unit receiver section configured to receive a first data unit in a first layer; and an extractor section configured to extract each of information elements from the first data unit received in the first layer, according to identification information being included in header information in the first data unit and identifying a type of each of the information elements, wherein each of the information elements is any of a higher layer data unit, control information, and padding information.

In the second aspect, the extractor section can be configured to extract the information elements from the first data unit according to not only the identification information but also information element size information indicating a size of each of the information elements.

A third aspect of the present invention is summarized as a mobile station including: a first data unit generator section configured to generate a first data unit by multiplexing information elements, in a first layer; and a first data unit transmitter section configured to transmit the generated first data unit, wherein each of the information elements is any of a higher layer data unit received from a layer higher than the first layer, control information, and padding information, and the first data unit generator section is configured to add header information to the first data unit, the header information including identification information identifying a type of each of the information elements multiplexed into the first data unit.

A fourth aspect of the present invention is summarized as a radio base station including: a first data unit generator section configured to generate a first data unit by multiplexing information elements in a first layer; and a first data unit transmitter section configured to transmit the generated first data unit, wherein each of the information elements is any of a higher layer data unit received from a layer higher than the first layer, control information and padding information, and the first data unit generator section is configured to add header information to the first data unit, the header information including identification information identifying a type of each of the information elements multiplexed into the first data unit.

A fifth aspect of the present invention is summarized as a mobile station including: a first data unit receiver section configured to receive a first data unit in a first layer; and an extractor section configured to extract each of information elements from the first data unit received in the first layer, according to identification information being included in header information in the first data unit and identifying a type of each of the information elements, wherein each of the information elements is any of a higher layer data unit, control information, and padding information.

A sixth aspect of the present invention is summarized as a radio base station including: a first data unit receiver section configured to receive a first data unit in a first layer; and an extractor section configured to extract each of information elements from the first data unit received in the first layer, according to identification information being included in header information in the first data unit and identifying a type of each of the information elements, wherein each of the information elements is any of a higher layer data unit, control information, and padding information.

A seventh aspect of the present invention is summarized as a mobile communication system configured to allow a mobile station and a radio base station to communicate with each other, wherein the mobile station includes: a first data unit generator section configured to generate a first data unit by multiplexing information elements in a first layer; and a first data unit transmitter section configured to transmit the generated first data unit, and the radio base station includes: a first data unit receiver section configured to receive the first data unit transmitted by the mobile station; and an extractor section configured to extract each of information elements from the received first data unit, according to identification information being included in header information in the first data unit and identifying a type of each of the information elements, each of the information elements is any of a higher layer data unit received from a layer higher than the first layer, control information, and padding information, and the first data unit generator section is configured to add the header information to the first data unit, the header information including identification information identifying a type of each of the information elements multiplexed into the first data unit.

A eighth aspect of the present invention is summarized as a mobile communication system configured to allow a mobile station and a radio base station to communicate with each other, wherein the radio base station includes: a first data unit generator section configured to generate a first data unit by multiplexing information elements in a first layer; and a first data unit transmitter section configured to transmit the generated first data unit, and the mobile station includes: a first data unit receiver section configured to receive the first data unit transmitted by the mobile station; and an extractor section configured to extract each of information elements from the received first data unit, according to identification information being included in header information in the first data unit and identifying a type of each of the information elements, each of the information elements is any of a higher layer data unit received from a layer higher than the first layer, control information, and padding information, and the first data unit generator section is configured to add the header information to the first data unit, the header information including identification information identifying a type of each of the information elements multiplexed into the first data unit.

A ninth aspect of the present invention is summarized as a mobile communication method for allowing a mobile station and a radio base station to communicate with each other, the method including steps: (A) generating, at the mobile station, a first data unit by multiplexing information elements in a first layer; (B) transmitting, at the mobile station, the generated first data unit; (C) receiving, at the radio base station, the first data unit transmitted by the mobile station; and (D) extracting, at the radio base station, each of the information elements from the received first data unit, according to identification information being included in header information of the first data unit and indicating a type of each of the information elements, wherein each of the information elements is any of a higher layer data unit received from a layer higher than the first layer, control information, and padding information, and in the step (A), the mobile station adds the header information to the first data unit, the header information including identification information identifying a type of each of the information elements multiplexed into the first data unit.

A tenth aspect of the present invention is summarized as a mobile communication method for allowing a mobile station and a radio base station to communicate with each other, the method including steps: (A) generating, at the radio base station, a first data unit by multiplexing information elements in a first layer; (B) transmitting, at the radio base station, the generated first data unit; (C) receiving, at the mobile station, the first data unit transmitted by the radio base station; and (D) extracting, at the mobile station, each of the information elements from the received first data unit, according to identification information being included in header information of the first data unit and indicating a type of each of the information elements, wherein each of the information elements is any of a higher layer data unit received from a layer higher than the first layer, control information, and padding information, and in the step (A), the radio base station adds the header information to the first data unit, the header information including identification information identifying a type of each of the information elements multiplexed into the first data unit.

BRIEF DESCRIPTION OF THE DRAWINGS

FIG. 5 is a diagram showing examples of information elements identified according to "C/T" included in an MAC header of an MAC-PDU transmitted by the transmitter apparatus according to the first embodiment of the present invention.

FIG. 6 is a diagram for explaining MAC control blocks multiplexed into an MAC-PDU transmitted by the transmitter apparatus according to the first embodiment of the present invention.

BEST MODE FOR CARRYING OUT THE INVENTION (Configuration of Mobile Communication System According to First Embodiment of the Present Invention)

With reference to FIGS. 1 to 9, descriptions will be given of a configuration of a mobile communication system including a transmitter apparatus 10 and a receiver apparatus 30 according to a first embodiment of the present invention. The configuration of the mobile communication system according to the present embodiment is one standardized under LTE (Long Term Evolution).

Here, a radio base station eNodeB may be the transmitter apparatus 10 according to the present embodiment, and a mobile station UE may be the receiver apparatus 30 according to the present embodiment. Instead, a radio base station eNodeB may be the receiver apparatus 30 according to the present embodiment, and a mobile station UE may be the transmitter apparatus 10 according to the present embodiment.

Figure 1:
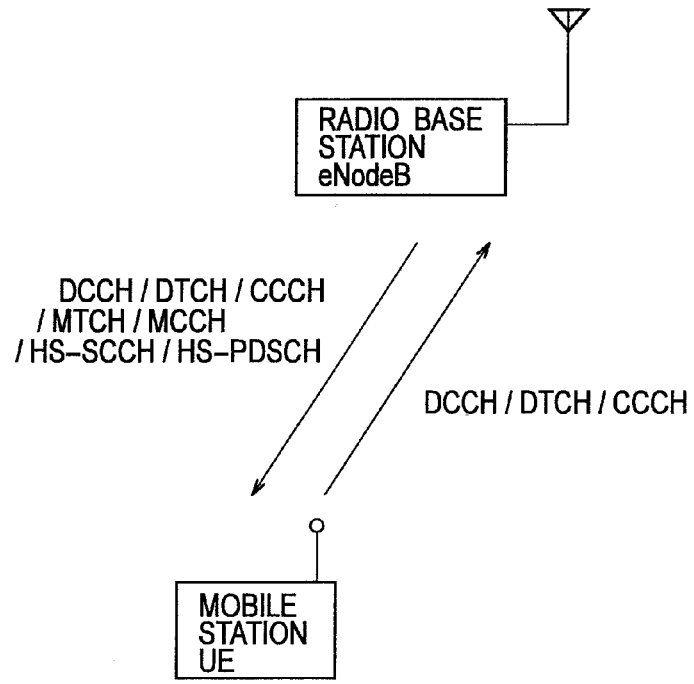
FIG. 1 is an overall configuration diagram of a mobile communication system according to a first embodiment of the present invention.
Figure 2:
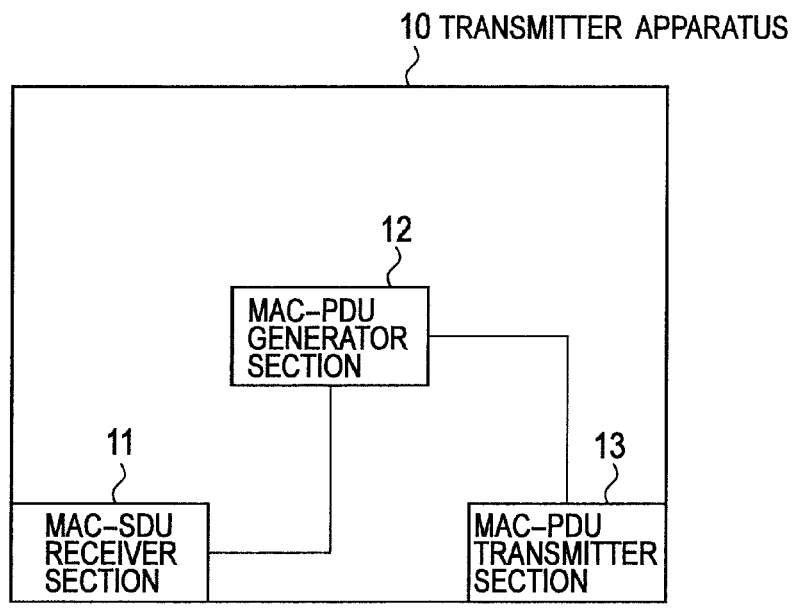
FIG. 2 is a functional block diagram of a transmitter apparatus according to the first embodiment of the present invention.

As shown in FIG. 2, the transmitter apparatus 10 includes an MAC-SDU (Service Data Unit) receiver section 11, an MAC-PDU generator section 12 and an MAC-PDU transmitter section 13, which serve as an MAC (Media Access Control) layer (first layer) function.

Figure 3:
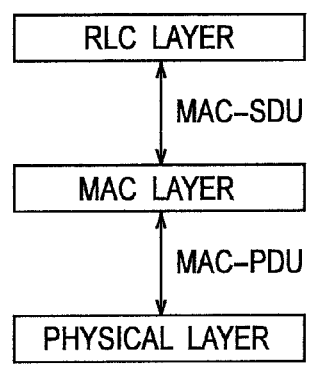
FIG. 3 is a diagram showing a protocol stack in the mobile communication system according to the first embodiment of the present invention.

The MAC-SDU receiver section 11 is configured to receive an MAC-SDU (a higher layer data unit) from an RLC (Radio Link Control) layer (a layer higher than an MAC layer) (see FIG. 3).

The MAC-PDU generator section 12 is configured to generate an MAC-PDU by multiplexing information elements in the MAC layer.

Here, each of the information elements is any of an MAC-SDU received from the RLC layer, an MAC control block (control information), and a Padding (padding information). Note that, the MAC control block (control information), and the Padding (padding information) are not those received from the RLC layer.

Figure 4:
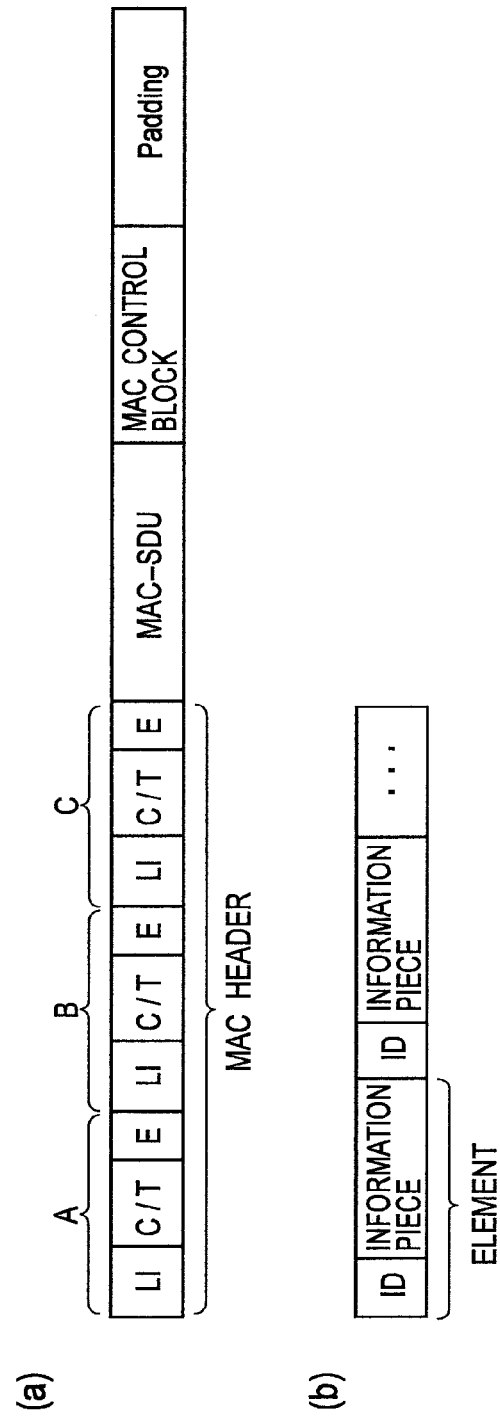
FIG. 4 is a diagram showing an example of a format of an MAC-PDU transmitted by a transmitter apparatus according to the first embodiment of the present invention.

For example, the MAC-PDU generator section 12 is configured to add an MAC header shown in FIG. 4 to an MAC-PDU, when multiplexing multiple information elements into the MAC-PDU (specifically, when multiplexing the MAC-SDU, the MAC control block and the Padding). Here, the sizes of the MAC-SDU, the MAC control block, and the Padding are variable.

The MAC header shown in FIG. 4 includes sets A to C each composed of "LI", "C/T" and "E." The set A is for the MAC-SDU, the set B is for the MAC control block and the set C is for the Padding.

In this regard, "LI (Length Indicator)" is information element size information indicating the size of each information element. In the example of FIG. 4, "LI" in the set A indicates the size of the MAC-SDU, "LI" in the set B indicates the size of the MAC control block, and "LI" in the set C indicates the size of the Padding.

Then, "C/T" is identification information identifying a type of each of information elements multiplexed into the MAC-PDU. In the example of FIG. 4, "C/T" in the set A is information for identifying a logical channel used for the MAC-SDU, "C/T" in the set B is information for identifying the MAC control block, and "C/T" in the set C is information for identifying the Padding.

FIGS. 5(a) and 5(b) show examples of information elements identified by the "C/T". FIG. 5(a) shows examples of "C/T" included in the MAC header of the MAC-PDU transmitted in a downlink channel or an uplink channel for normal communications. FIG. 5(b) shows examples of "C/T" included in the MAC header of the MAC-PDU transmitted in a channel for multicast communications.

In FIG. 5(a), "C/T"="0000" identifies the MAC-SDU for a DCCH, "C/T"="0001 to 1000" identifies the MAC-SDUs for DTCHs #1 to #8, "C/T"="1001" identifies the MAC-SDUs for a CCCH, "C/T"="1010" identifies the MAC control block, and "C/T"="1011" identifies the Padding.

Moreover, in FIG. 5(b), "C/T"="0000" identifies the MAC-SDU for an MCCH, "C/T"="0001 to 1111" identifies the MAC-SDUs for MTCHs #1 to #15.

Note that, as shown in FIG. 4(b), the MAC control block multiplexed into the MAC-PDU includes one or more elements each composed of an "ID" and an "information piece".

Here, FIGS. 6(a) and 6(b) show examples of correspondences between the "IDs" and "information pieces" constituting the MAC control block. FIG. 6(a) shows an example of the MAC control block multiplexed into the MAC-PDU transmitted in an uplink channel for normal communications, while FIG. 6(b) shows an example of the MAC control block multiplexed into the MAC-PDU transmitted in a downlink channel for normal communications.

In FIG. 6(a), the "information piece" identified by "ID"="00" is "Buffer status report" indicating an absolute value or a relative value of a buffer amount. Here, the length (size) of each of the "information pieces" is determined in advance as shown in FIG. 6(a).

In FIG. 6(b), the "information piece" identified by "ID"="00" is "Timing Advance". Here, the length (size) of each of the "information pieces" is also determined in advance as shown in FIG. 6(b).

In addition, the "E (Extension)" is information indicating whether or not the "E" itself is positioned at the end of the MAC header. For example, when "E" is "0", the "E" indicates that the "E" itself is positioned at the end of the MAC header, and is followed by any one of the MAC-SDU, the MAC control block and the Padding.

On the other hand, when "E" is "1", the "E" indicates that the "E" itself is not positioned at the end of the MAC header, but is followed by another set composed of "LI", "C/T" and "E".

In the example of FIG. 4, the "E" in the set A and the set B indicates that the "E" is not positioned at the end of the MAC header, while the "E" in the set C indicates that the "E" is positioned at the end of the MAC header.

The MAC-PDU transmitter section 13 is configured to transmit, as a single transport block, the MAC-PDU generated by the MAC-PDU generator section 12, to a physical layer (see FIG. 3).

Figure 7:
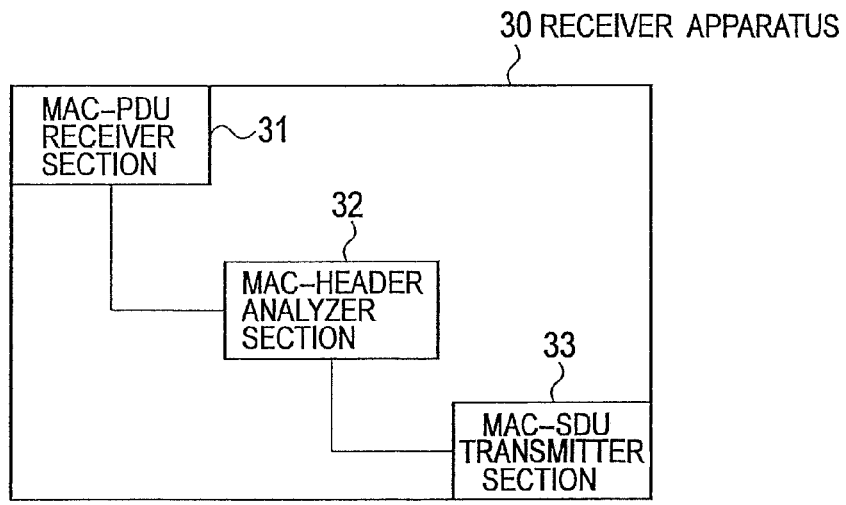
FIG. 7 is a functional block diagram of a receiver apparatus according to the first embodiment of the present invention.

As shown in FIG. 7, the receiver apparatus 30 includes an MAC-PDU receiver section 31, an MAC header analyzer section 32 and an MAC-SDU transmitter section 33, which serve as an MAC layer function.

The MAC-PDU receiver section 31 is configured to receive the MAC-PDU transmitted by the transmitter apparatus 10, through the physical layer (see FIG. 3).

The MAC header analyzer section 32 is configured to identify the type of each of information elements, which are multiplexed into the MAC-PDU received in the MAC layer, according to "C/T" included in the MAC header of the MAC-PDU, and to detect the size of each of the information elements (the MAC-SDU, the MAC control block, and the Padding) multiplexed into the MAC-PDU, according to the "LI (information element size information)" included in the MAC header.

Note that the MAC header analyzer section 32 can detect the end of the MAC header according to the "E" included in the MAC header of the MAC-PDU.

The MAC-SDU transmitter section 33 is configured to extract each of the information elements from the MAC-PDU, according to the size of the information element detected by the MAC header analyzer section 32.

Moreover, the MAC-SDU transmitter section 33 is configured to transmit the extracted MAC-SDU to the RLC layer.

(Operation of Mobile Communication System According to First Embodiment of the Present Invention)

Figure 8:
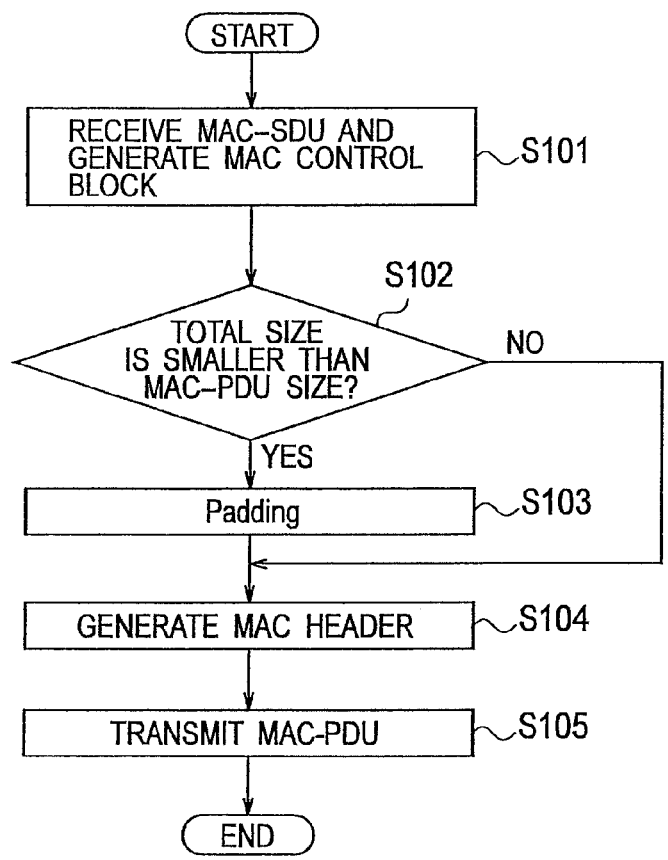
FIG. 8 is a flowchart showing an operation of the transmitter apparatus according to the first embodiment of the present invention.
Figures 9, 10:
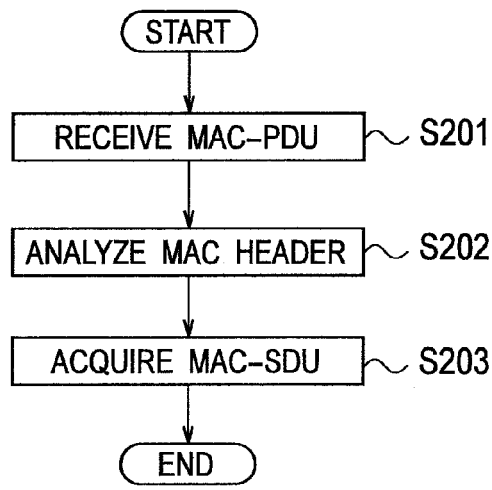
FIG. 9 is a flowchart showing an operation of the receiver apparatus according to the first embodiment of the present invention.
FIG. 10 is a diagram showing an example of a format of an MAC-hs PDU used in HSDPA.

With reference to FIGS. 8 and 9, description will be given of an operation of the mobile communication system according to the first embodiment of the present invention.

In the first place, an operation of the transmitter apparatus 10 according to the present embodiment will be described with reference to FIG. 8.

As shown in FIG. 8, in step S101, an MAC layer function of the transmitter apparatus 10 receives an MAC-SDU to be transmitted to the receiver apparatus 30, from the RLC layer of the transmitter apparatus 10, and generates a necessary MAC control block.

In step S102, the MAC layer function determines whether or not the total size of the information elements (the MAC-SDU and the MAC control block) to be multiplexed is smaller than the size of an MAC-PDU notified by the physical layer.

If it is determined that the total size is smaller than the size of the MAC-PDU, the MAC layer function performs padding processing in step S103 so that the total size of the information elements to be multiplexed can be equal to the size of the MAC-PDU (in other words, adds a necessary length of a Padding). Then, this operation proceeds to step S104.

On the other hand, when it is determined the total size is not smaller than the size of the MAC-PDU (is larger than the size of the MAC-PDU or is equal to the size of the MAC-PDU), the MAC layer function generates an MAC header in step S104 without performing the padding processing. The MAC header here generated includes a set of "LI", "C/T" and "E" associated with each of the information elements to be multiplexed.

In step S105, the MAC layer function generates an MAC-PDU to which the generated MAC header is added, and transmits the generated MAC-PDU to the receiver apparatus 30 through the physical layer of the transmitter apparatus 10.

In the second place, an operation of the receiver apparatus 30 according to the present embodiment will be described with reference to FIG. 9.

As shown in FIG. 9, the MAC layer function of the receiver apparatus 30 receives the MAC-PDU transmitted by the transmitter apparatus 10, through the physical layer of the receiver apparatus 30.

In step S202, an MAC layer function of the receiver apparatus 30 analyzes the MAC header added to the received MAC-PDU.

In step S203, the MAC layer function of the receiver apparatus 30 identifies the information elements multiplexed into the MAC-PDU, according to "C/T" included in the MAC header, and acquires the identified information elements (for example, the MAC-SDU), according to "LI" included in the MAC header.

Note that the MAC layer function of the receiver apparatus 30 iteratively performs step S203 until a value set for the "E" included in the MAC header becomes "0".

(Operations and Effects of Mobile Communication System According to First Embodiment of the Present Invention)

The mobile communication system according to the first embodiment of the present invention is capable of setting "C/T" for identifying the MAC control block and the Padding and "LI" indicating the sizes of the MAC control block and the Padding, in the MAC header, and thereby enables multiplexing of the MAC control block and the Padding with variable lengths for an MAC-PDU.

Hereinabove, the present invention has been described in detail by use of the foregoing embodiment. It is obvious, however, to those skilled in the art that the present invention should not be limited to the embodiment described in this description. The present invention is implementable as modified and improved embodiments without departing from the sprit and the scope of the present invention defined by the description of the scope of the appended claims. Therefore, the explanation of this description is intended only to explain an illustrative example of the present invention, and is not intended to impose any limitation on the present invention.

Industrial Applicability

As has been described above, the present invention enables provision of a transmitter apparatus and a receiver apparatus which are capable of multiplexing not only a higher layer data unit but also control information and padding information into a first data unit.

The invention claimed is:

1. A method comprising:
generating a Media Access Control (MAC) Protocol Data Unit (PDU) including a MAC header, by multiplexing one or more information elements in a MAC layer;
wherein
the MAC header comprises a first set corresponding to a Media Access Control-Service Data Unit (MAC-SDU) received from a higher layer of the MAC layer, a second set corresponding to control information and a third set corresponding to padding information, when multiplexing, as the information elements, the MAC-SDU, the control information and the padding information;
each of the first set, the second set and the third set is formed by a format including identification information and information indicating whether each of the first set, the second set and the third set is positioned at the end of the MAC header or not;
first identification information included in the first set is information identifying the MAC-SDU;
second identification information included in the second set is information identifying the control information;
third identification information included in the third set is information identifying the padding information;
the control information includes one or more elements including an ID indicating a type of the control information and an information piece, and
a first information element information identifies a MAC-SDU corresponding to a Dedicated Control Channel (DCCH), information identifying a MAC-SDU corresponding to a Dedicated Traffic Channel (DTCH), and information identifying a MAC-SDU corresponding to a Common Control Channel (CCCH).

2. A method comprising:
receiving a Media Access Control-Protocol Data Unit (MAC-PDU), in which one more information elements are multiplexed and which includes a Media Access Control (MAC) header, in a MAC layer; and extracting, as the information element, a Media Access Control-Service Data Unit (MAC-SDU) in accordance with a first set corresponding to the MAC-SDU from the MAC- PDU, extracting, as the information element, control information in accordance with a second set corresponding to the control information from the MAC-PDU, and extracting, as the information element, padding information in accordance with a third set corresponding to the padding information from the MAC-PDU, when the MAC-header includes the first set, the second set and the third set;

wherein each of the first set, the second set and the third set is formed by a format including identification information and information indicating whether each of the first set, the second set and the third set is positioned at the end of the MAC header or not;

first identification information included in the first set is information identifying the MAC-SDU;

second identification information included in the second set is information identifying the control information;

third identification information included in the third set is information identifying the padding information;

the control information includes one or more elements including an ID indicating a type of the control information and information; and a first information element information identifies a MAC-SDU corresponding to a Dedicated Control Channel (DCCH), information identifying a MAC-SDU corresponding to a Dedicated Traffic Channel (DTCH), and information identifying a MAC-SDU corresponding to a Common Control Channel (CCCH).

3. A method comprising:

generating, at a mobile station, a Media Access Control (MAC) Protocol Data Unit (PDU) including a MAC header, by multiplexing one or more information elements in a MAC layer;

wherein the the MAC header comprises a first set corresponding to a Media Access Control-Service Data Unit (MAC-SDU) received from a higher layer of the MAC layer, a second set corresponding to control information and a third set corresponding to padding information, when multiplexing, as the information elements, the MAC-SDU, the control information and the padding information;

each of the first set, the second set and the third set is formed by a format including identification information and information indicating whether each of the first set, the second set and the third set is positioned at the end of the MAC header or not;

first identification information included in the first set is information identifying the MAC-SDU;

second identification information included in the second set is information identifying the control information;

third identification information included in the third set is information identifying the padding information;

the control information includes one or more elements including an ID indicating a type of the control information and an information piece; and a first information element information identifies a MAC-SDU corresponding to a Dedicated Control Channel (DCCH), information identifying a MAC-SDU corresponding to a Dedicated Traffic Channel (DTCH), and information identifying a MAC-SDU corresponding to a Common Control Channel (CCCH).

4. A method comprising:

generating, at a radio base station, a Media Access Control (MAC) Protocol Data Unit (PDU) including a MAC header, by multiplexing one or more information elements in a MAC layer;

wherein the the MAC header comprises a first set corresponding to a Media Access Control-Service Data Unit (MAC-SDU) received from a higher layer of the MAC layer, a second set corresponding to control information and a third set corresponding to padding information, when multiplexing, as the information elements, the MAC-SDU, the control information and the padding information;

each of the first set, the second set and the third set is formed by a format including identification information and information indicating whether each of the first set, the second set and the third set is positioned at the end of the MAC header or not;

first identification information included in the first set is information identifying the MAC-SDU;

second identification information included in the second set is information identifying the control information;

third identification information included in the third set is information identifying the padding information;

the control information includes one or more elements including an ID indicating a type of the control information and an information piece; and a first information element information identifies a MAC-SDU corresponding to a Dedicated Control Channel (DCCH), information identifying a MAC-SDU corresponding to a Dedicated Traffic Channel (DTCH), and information identifying a MAC-SDU corresponding to a Common Control Channel (CCCH).

5. A method comprising:

receiving, at a mobile station a Media Access Control-Protocol Data Unit (MAC-PDU), in which one or more information elements are multiplexed and which includes a Media Access Control (MAC) header, in a MAC layer; and extracting, as the information element, a Media Access Control-Service Data Unit (MAC-SDU) in accordance with a first set corresponding to the MAC-SDU from the MAC-PDU, extracting, as the information element, control information in accordance with a second set corresponding to the control information from the MAC-PDU, and extracting, as the information element, padding information in accordance with a third set corresponding to the padding information from the MAC-PDU, when the MAC-header includes the first set, the second set and the third set;

wherein each of the first set, the second set and the third set is formed by a format including identification information and information indicating whether each of the first set, the second set and the third set is positioned at the end of the MAC header or not;

first identification information included in the first set is information identifying the MAC-SDU;

second identification information included in the second set is information identifying the control information;

third identification information included in the third set is information identifying the padding information;

the control information includes one or more elements including an ID indicating a type of the control information and an information piece; and a first information element information identifies a MAC-SDU corresponding to a Dedicated Control Channel (DCCH), information identifying a MAC-SDU corresponding to a Dedicated Traffic Channel (DTCH), and information identifying a MAC-SDU corresponding to a Common Control Channel (CCCH).

6. A method comprising:

receiving, at a radio base station a Media Access Control-Protocol Data Unit (MAC-PDU), in which one or more information elements are multiplexed and which includes a Media Access Control (MAC) header, in a MAC layer; and extracting, as the information element, a Media Access Control-Service Data Unit (MAC-SDU) in accordance with a first set corresponding to the MAC-SDU from the MAC-PDU, extracting, as the information element, control information in accordance with a second set corresponding to the control information from the MAC-PDU, and extracting, as the information element, padding information in accordance with a third set corresponding to the padding information from the MAC-PDU, when the MAC header includes the first set, the second set and the third set;

wherein each of the first set, the second set and the third set is formed by a format including identification information and information indicating whether each of the first set, the second set and the third set is positioned at the end of the MAC header or not;

first identification information included in the first set is information identifying the MAC-SDU;

second identification information included in the second set is information identifying the control information;

third identification information included in the third set is information identifying the padding information;

the control information includes one or more elements including an ID indicating a type of the control information and an information piece; and a first information element information identifies a MAC-SDU corresponding to a Dedicated Control Channel (DCCH), information identifying a MAC-SDU corresponding to a Dedicated Traffic Channel (DTCH), and information identifying a MAC-SDU corresponding to a Common Control Channel (CCCH).

* * * * *